March 15, 1932.  E. K. MILES  1,849,682
TRIMMER OR GRASS CUTTER
Filed Dec. 12, 1927  2 Sheets-Sheet 1
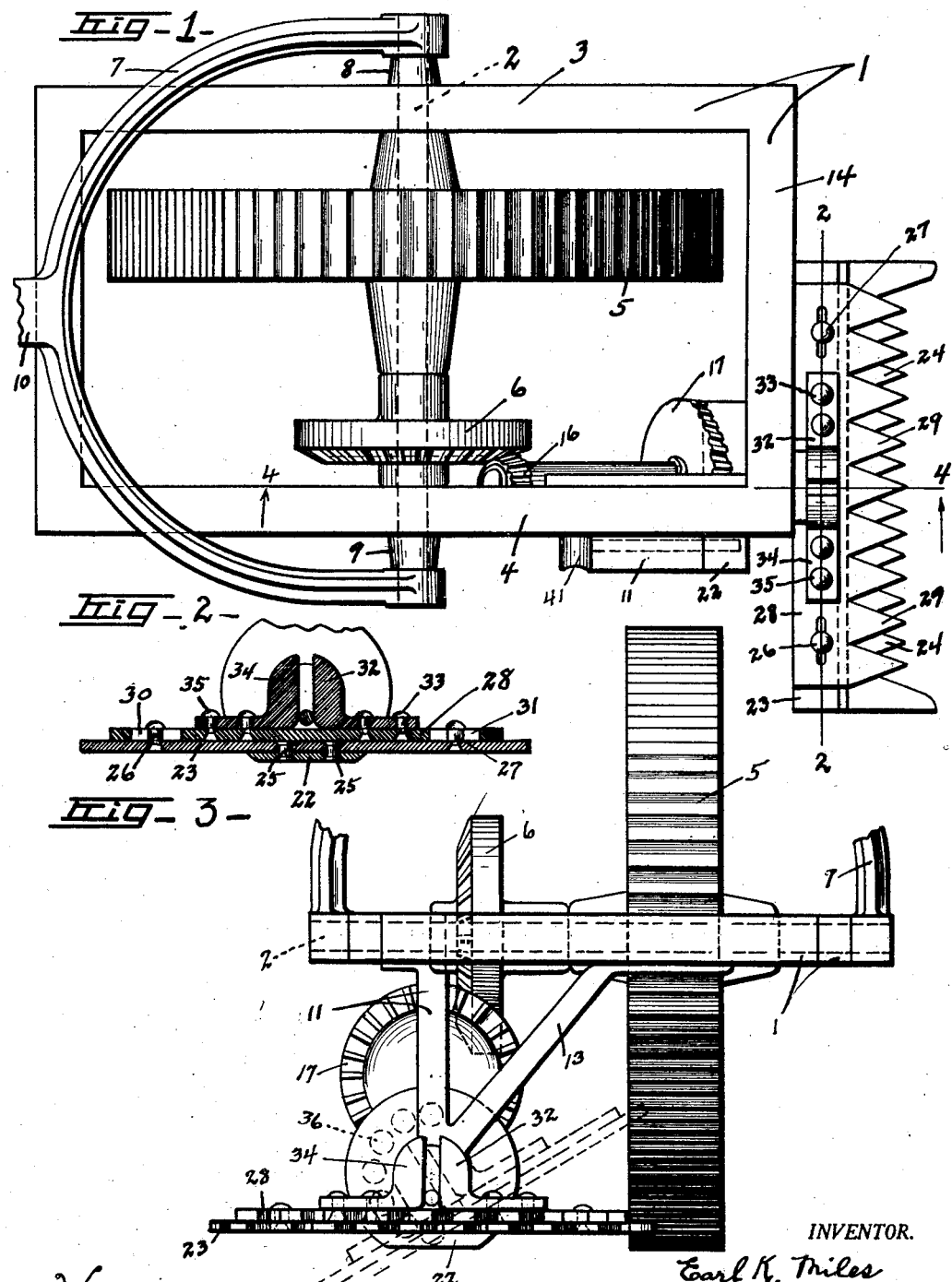
INVENTOR.
Earl K. Miles
BY Denison Thompson
ATTORNEYS.
WITNESS
H. L. Meade.

March 15, 1932.  E. K. MILES  1,849,682
TRIMMER OR GRASS CUTTER
Filed Dec. 12, 1927  2 Sheets-Sheet 2
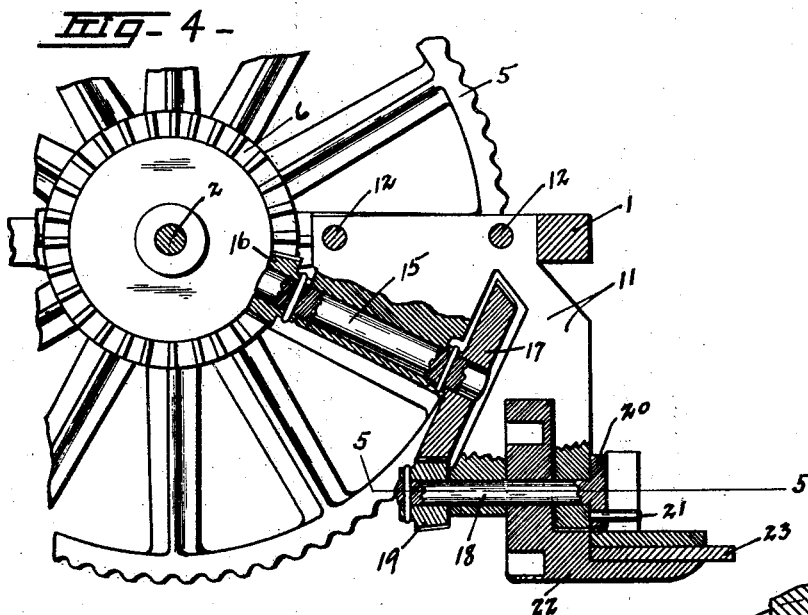
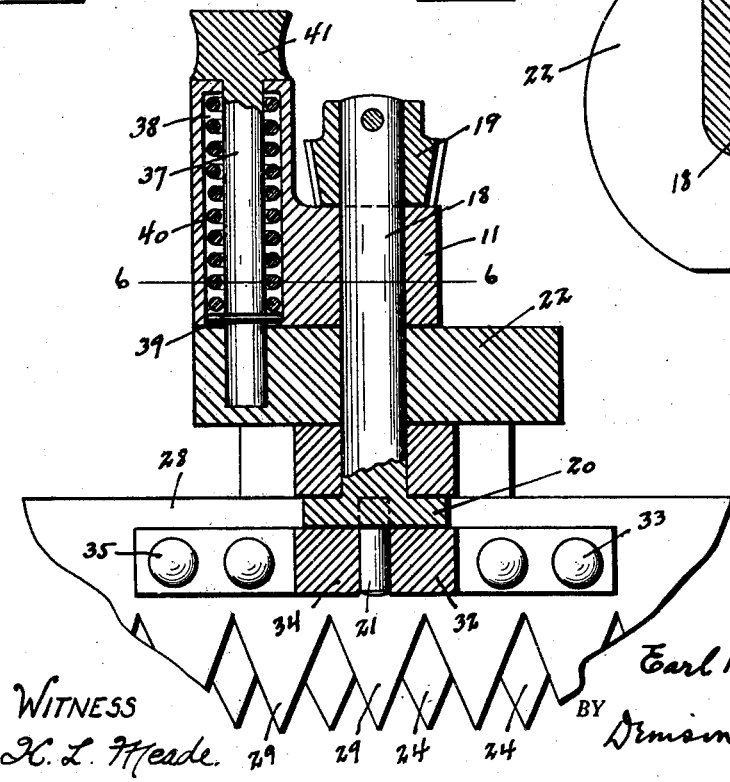
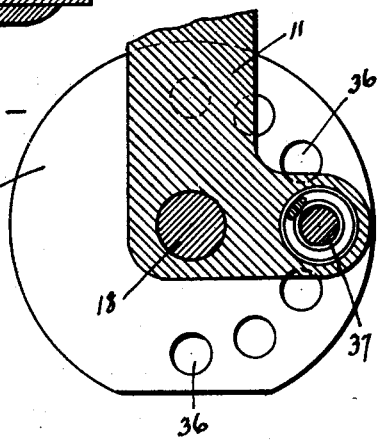
INVENTOR.
Earl K. Miles
BY Denison Thompson
ATTORNEYS.

Patented Mar. 15, 1932

1,849,682

UNITED STATES PATENT OFFICE

EARL K. MILES, OF CANASTOTA, NEW YORK

TRIMMER OR GRASS CUTTER

Application filed December 12, 1927. Serial No. 239,593.

This invention relates to a new and improved trimmer or grass cutter.

In cutting grass on lawns and in gardens, the contour of the surface of the lawn or garden frequently makes it difficult to cut the same properly with the ordinary type of grass cutter which is equipped with a horizontally suspended row of cutting knives. This is particularly true of the edges of a grass plot which are usually so built that they slope downwardly from the main body of the plot.

The main object of my invention is to provide a trimmer or grass cutter, which has a plurality of co-operating cutting blades which are normally held in a horizontal position, but which is of such a construction that the row of cutting blades may be moved angularly in relation to the plot upon which the device is being used so that they will be in a position to cut the grass on such portions of the plot as slope downwardly from the main plot.

Another object of my invention is to provide a structure in which this angular relation of the cutting blade may be obtained and maintained while the main body of the device is held in the normal upright position.

Another object of my invention is to provide a structure in which the driving means will positively actuate the cutting blade, irrespective of the position of the cutting blade in relation to the main body of the device.

Other objects and advantages relate to the size, shape and arrangement of parts, all as will more fully appear from the following description taken in connection with the accompanying drawings, in which:

Figure 1 is a top plan view of my improved grass cutter.

Figure 2 is a section on line 2—2 of Figure 1.

Figure 3 is a front elevation, partially broken away, of my device.

Figure 4 is a section on line 4—4 of Figure 1.

Figure 5 is a section on line 5—5 of Figure 4.

Figure 6 is a section on line 6—6 of Figure 5.

My device consists of a main body frame 1, substantially rectangular in shape having the opposite ends of a transverse shaft 2, shown in dotted lines in Figures 1 and 3, journaled in the opposite side bars 3 and 4 of frame 1, at approximately the mid-point thereof. A driving wheel 5 is splined or otherwise secured to shaft 2 between the side bars 3 and 4 and having one hub abutting against the side bar 3. A bevel gear 6 is splined or otherwise secured to shaft 2 between the driving wheel 5 and side bar 4. A driving yoke 7 has one end journaled on shaft 2 adjacent side bar 3 and is held in spaced relation thereto by a spacer 8 on shaft 2. The other end of yoke 7 is journaled on shaft 2 adjacent side bar 4 and is held in spaced relation thereto by a spacer 9 on shaft 2. Although it is not here shown, it will be understood that a shaft ending in a handle is provided on yoke 7 to facilitate the manual manipulation of the device, the broken away end of such handle being indicated at 10 on Figure 1.

A supplemental frame 11 is secured to the under surface of side bar 4 by bolts 12 or other convenient means, supplemental frame 11 being held rigidly in position by a diagonally extending brace 13, which has its upper end secured to the under surface of the front cross bar 14 of frame 1.

As perhaps may best be seen from Figure 4, a shaft 15 is journaled in frame 11 and carries on the upper end thereof a pinion gear 16 in mesh with bevel gear 6. The other end of shaft 15 has secured thereto a bevel gear 17. A second shaft 18 is journaled in frame 11 and carries on its rear end a pinion gear 19 in mesh with bevel gear 17. The forward end of shaft 18 is provided with a circular disk 20 carrying an outwardly extending offset pin 21 for a purpose hereinafter to be described. A blade support 22 is rotatably mounted on shaft 18 between gear 19 and disk 20. A plate 23 having a plurality of forwardly extending cutting teeth 24 in spaced relation is secured to the upper surface of blade support 22 by rivets 25 or other convenient means. Plate 22 is also provided adjacent its ends with a pair of spaced vertically extending headed lugs 26 and 27. A complementary plate 28 having a plurality of forwardly extending teeth 29 is slidably mounted on the upper surface of plate 23, such sliding movement of plate 28 in relation to plate 23 being permitted by the provision in plate 28 of slots 30 and 31, through which lugs 26 and 27 extend.

On the upper surface of plate 28, I provide a vertically extending guide 32 secured to plate 28 by rivets 23 or other convenient means, and, in spaced relation to guide 32, I provide a second guide 34 secured to plate 28 by rivets 35 or other convenient means. The relation of parts is such that the pin 21 on disk 20 extends forwardly between guides 32 and 34.

The blade support 22 is provided with a plurality, in this case shown as seven, of apertures 36. I provide on frame 11, adjacent blade support 22 a plunger 37 slidably mounted in a cylindrical casing 38. Plunger 37 is provided adjacent its forward end, but in spaced relation thereto, with a collar 39. A spiral spring 40 encircles plunger 37 and has one end abutting against collar 39 and the other end abutting against the partially closed upper end of casing 48. The action of spring 40 normally presses plunger 37 forwardly out of cylindrical casing 38. The arrangement of parts is such that the plunger 37 will successively come into registration with the apertures 36 in blade support 22, as the same is rotated about shaft 18. A knob 41 is provided on the inner end of plunger 37 so that the same may be manually grasped and plunger 37 retracted against the action of spring 40 to permit the end of plunger 37 to be withdrawn from apertures 36 to permit the rotation of blade support 22. With this arrangement of parts, it will be seen that blade support 22 carrying plates 23 and 28 may be secured in a plurality of angular relations to the frame 11 and, therefore, in a plurality of angular relations to the frame 1 and to the driving wheel 5.

When it is desired to trim or cut a plot of ground which is approximately flat, the blade support 22 is rotated about the shaft 18 until the plunger 37 comes into registration with an aperture 36, which will secure the blade support 22 in such a position that with the driving wheel 5 in an upright position, the plates 23 and 28 will be in parallel relation with the plot of ground upon which the device rests. The device is then pushed forward by means of handle 10 and yoke 7 with the result that the rotation of driving wheel 5, will through shaft 2 cause the rotation of spiral gear 17, which in turn, through pinion gear 19 and shaft 18 will cause the rotation of disk 20. The rotation of disk 20, pin 21 being off-set thereon, will cause pin 21 to bear alternately against guides 32 and 34 to cause plate 28 to be moved back and forth across the upper surface of plate 23, and this movement of plate 28 will cause teeth 29 to be moved back and forth across the upper surface of teeth 24 so that any grass positioned between such teeth 29 and 24 will be sheared off by them.

When it is desired to cut or trim the sloping edge of a plot, the plunger 37 is withdrawn from the apertures 36 with which it was in registration and the blade carrier is then rotated about shaft 18 until the plates 23 and 28 are brought to the proper angular relation with relation to driving wheel 5 to conform with the slope of the plot which it is desired to cut. For example, in Figure 3 I have shown in dotted lines the plates 23 and 28 in an angular position and adapted to cut a plot which is in sloping relation to the level plot upon which the driving wheel 5 is positioned.

It will be understood that inasmuch as the axis upon which the blade support 22 revolves is the same as the axis upon which the disk 20 carrying pin 21 revolves, the movement of the plates 23 and 28 to an angular position with relation to driving wheel 5 will not affect the co-operating function of pin 21 and guides 32 and 34.

It will be understood that although I have here shown a particular arrangement of parts, as for example, a single driving wheel and a particular train of gearing, various modifications and changes may be made in the driving members of my device without departing from the spirit of my invention and it will also be understood that means other than those specifically described may be used to secure the cutting blades in various angular positions, for although I have shown and described a specific structure and form of part, as illustrative of an embodiment of my invention, I do not desire to restrict myself to the exact size shape or arrangement of parts, as various changes may be made within the scope of the appended claims.

I claim:

1. In a device of the class described, a driving wheel, a frame supported thereby, a blade support pivotally mounted on the frame, cutting blades mounted on the blade support, means for securing the cutting blades in different angular positions in relation to the axis of the driving wheel including a plurality of apertures in the blade support and a plunger on the frame adapted to engage a selected aperture, and means for operating the cutting blades.

2. In a device of the class described, a main frame, a shaft journaled in the main frame, a driving wheel secured to the shaft, a bevel gear secured to the shaft, a second shaft journaled in the frame, a bevel gear on the end of the second named shaft in mesh with the first named gear, a pinion gear on the other end of the last named shaft, a third shaft journaled in the frame, a pinion gear on one end of the last named shaft in mesh with the last named bevel gear, a disk having an outwardly extending offset pin secured to the other end of the third named shaft, a blade support pivotally mounted on the third named shaft, a pair of cutting blades mounted on the blade support and normally disposed in planes parallel to the axis of the driving wheel, a guideway mounted on one of said blades and cooperating with the pin, means for securing the blade support in different positions in relation to the frame whereby the blades will be held in planes which are angularly disposed in relation to the axis of the driving wheel, and means for propelling the frame with the driving wheel in contact with the ground whereby rotary motion will be transmitted from the driving wheel to the disk.

3. In a device of the class described, a frame, a driving wheel rotatably mounted on the frame, a cutting blade support pivotally mounted intermediate its ends on the frame, cutting blades on said support, means for normally securing the cutting blades in planes parallel to the axis of the driving wheel, and in angular relation to said axis, and means for operating the cutting blades.

EARL K. MILES.